(12) United States Patent
Ebata

(10) Patent No.: US 7,532,629 B2
(45) Date of Patent: May 12, 2009

(54) MULTI-HOP NETWORK FOR TRANSMISSION OF PACKETS WHOSE SIZE IS DETERMINED BY HOP COUNT NUMBER

(75) Inventor: Koichi Ebata, Tokyo (JP)

(73) Assignee: NEC Corporation, Tokyo (JP)

( * ) Notice: Subject to any disclaimer, the term of this patent is extended or adjusted under 35 U.S.C. 154(b) by 1151 days.

(21) Appl. No.: 10/389,762

(22) Filed: Mar. 18, 2003

(65) Prior Publication Data

US 2003/0174652 A1 Sep. 18, 2003

(30) Foreign Application Priority Data

Mar. 18, 2002 (JP) ............................. 2002-074750

(51) Int. Cl.
*H04L 12/28* (2006.01)
(52) U.S. Cl. ..................... 370/401; 370/474; 370/412; 370/252
(58) Field of Classification Search ...................... None
See application file for complete search history.

(56) References Cited

U.S. PATENT DOCUMENTS

| 5,530,963 | A | * | 6/1996 | Moore et al. | ................. | 709/243 |
| 7,123,620 | B1 | * | 10/2006 | Ma | ....................... | 370/395.32 |
| 7,245,915 | B2 | * | 7/2007 | Matta et al. | .................. | 455/436 |
| 2002/0051427 | A1 | * | 5/2002 | Carvey | ...................... | 370/254 |
| 2002/0062388 | A1 | * | 5/2002 | Ogier et al. | ................. | 709/238 |

FOREIGN PATENT DOCUMENTS

| EP | 0 458 033 A2 | 11/1991 |
| JP | 10-229405 | 8/1998 |
| JP | 10-271040 | 10/1998 |
| JP | 11-136284 | 5/1999 |
| JP | 2000-101584 | 4/2000 |
| JP | 2000-115171 | 4/2000 |

(Continued)

OTHER PUBLICATIONS

Lettieri P. et al.: "Adaptive Frame Length Control for Improving Wireless Link Throughput, Range, and Energy Efficiency", Infocom '98, Seventeenth Annual Joint Conference of the IEEE Computer and Communications Societies, Proceedings, IEEE San Francisco, CA, USA, Mar. 29-Apr. 2, 1998, New York, NY, USA, IEEE, US, Mar. 29, 1998, pp. 564-571, XP010270390.

(Continued)

*Primary Examiner*—Duc C Ho
(74) *Attorney, Agent, or Firm*—Young & Thompson

(57) ABSTRACT

In a source node of a multi-hop network is provided with a route table in which a number of routes from the node to all destinations are mapped to hop count numbers. In response to a request for transmission of data, the node determines a hop count number from the route table corresponding to a route indicated in the request and segments the data into a number of data segments according to the hop count number. The data segments are converted into packets and transmitted. In a transit node, the packets are placed into one of a set of queuing buffers that corresponds to the hop count number of the packets. The stored packets are scheduled for transmission according to their hop count number.

37 Claims, 5 Drawing Sheets

FOREIGN PATENT DOCUMENTS

| JP | 2001-127797 | 5/2001 |
|----|-------------|--------|
| JP | 2001-197144 | 7/2001 |
| JP | 2001-230815 | 8/2001 |
| JP | 2001-339432 | 12/2001 |
| JP | 2002-64546  | 2/2002 |

OTHER PUBLICATIONS

Lee M. et al.: "PatchODMRP: An Ad-hoc Multicast Routing Protocol", 2001, pp. 537-543, XP010534318.

Mark Karol et al., "Prevention of Deadlocks and Livelocks in Lossless, Backpressured Packet Networks," IEEE INFOCOM, 2000, pp. 1333-1342.

3rd Generation Partnership Project; Technical Specification Group Radio Access Network; Physical Layer Aspects of UTRA High Speed Downlink Packet Access (Release 2000).

* cited by examiner

FIG. 3
ROUTE TABLE

| NEXT NODE | DEST. NODE | HOP COUNT |
|---|---|---|
| B | B | 1 |
| B | C | 2 |
| D | D | 1 |
| B | E | 3 |
| ⋮ | ⋮ | ⋮ |
|  |  |  |

FIG. 4
MAPPING TABLE

| HOP COUNT | PACKET SIZE |
|---|---|
| 1 | S1 |
| 2 | S2 |
| 3 | S3 |
| ⋮ | ⋮ |
| N | SN |

FIG. 5

ROUTE TABLE

| SOURCE NODE | DEST. NODE | HOP COUNT |
|---|---|---|
| A | B | 1 |
| A | C | 2 |
| A | D | 1 |
| A | B | 3 |
| B | A | 1 |
| B | C | 1 |
| B | D | 2 |
| B | E | 2 |
| ⋮ | ⋮ | ⋮ |
|  |  |  |

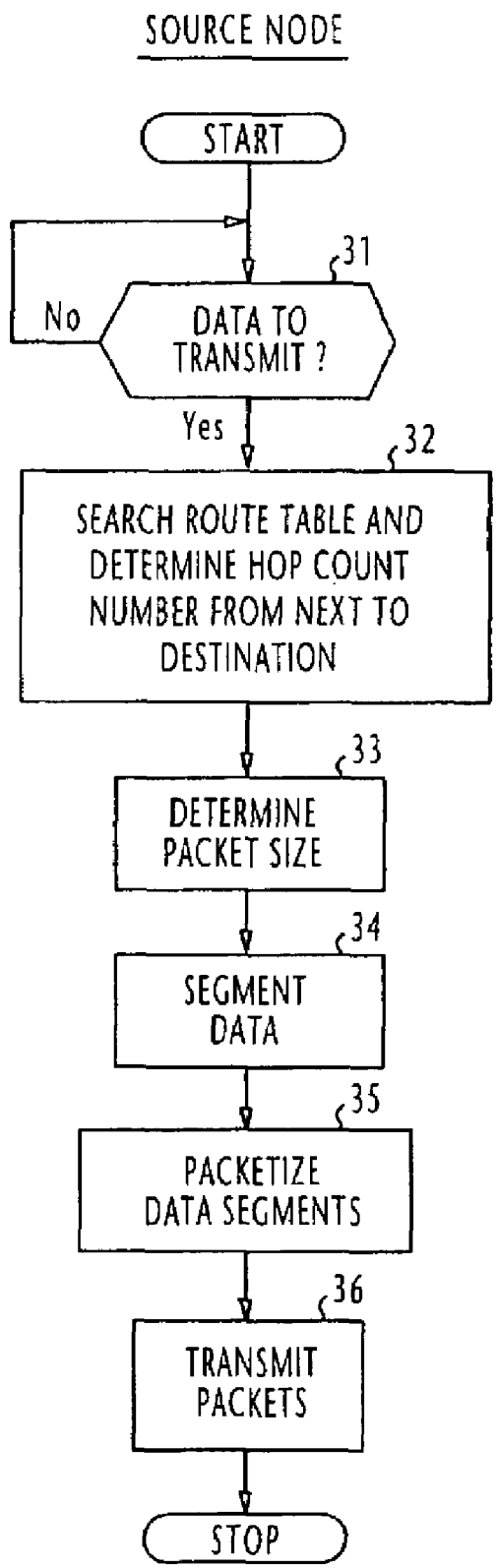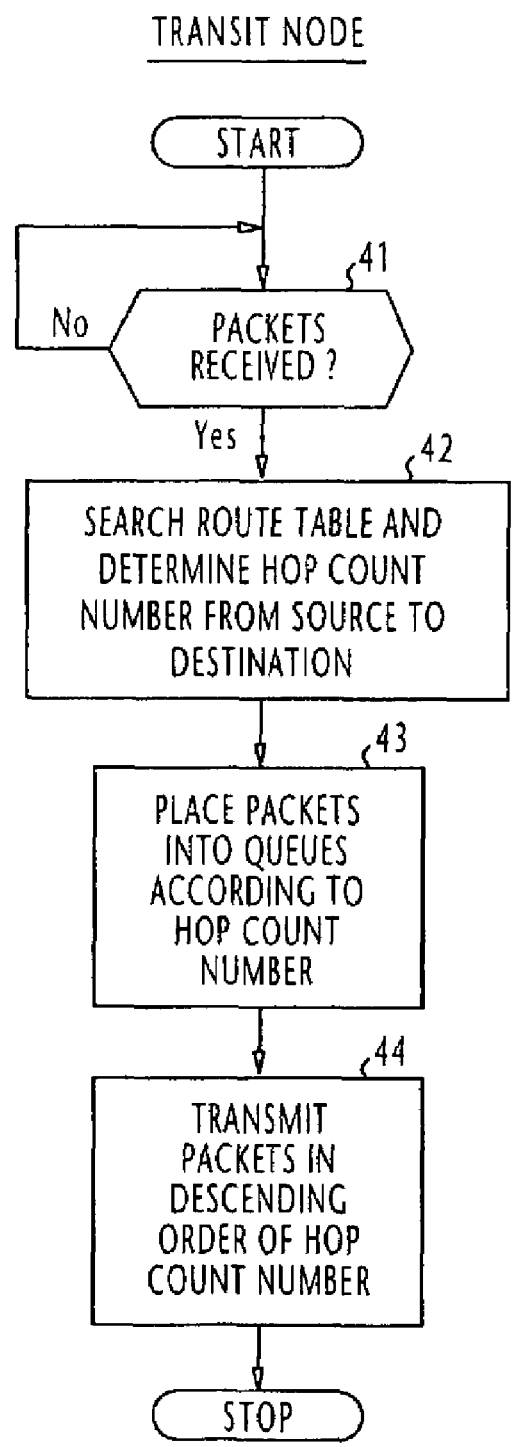

MULTI-HOP NETWORK FOR TRANSMISSION OF PACKETS WHOSE SIZE IS DETERMINED BY HOP COUNT NUMBER

BACKGROUND OF THE INVENTION

1. Field of the Invention

The present invention relates to multi-hop networks. The present invention is particularly suitable for applications where an autonomous ad hoc wireless network is formed by a number of wireless nodes.

2. Description of the Related Art

In a prior art multi-hop network, a message is segmented into a plurality of packets of a predetermined size and transmitted to a transit node where the packets are placed in a queue waiting to be served in a first-in-first-out basis. If QoS (quality of service) parameter is specified for an application, packets are queued according to the priority of their QoS parameter to guarantee the specified quality of the application.

Since packets are processed at each transit node of the network, the packet size and the processing delay are the determining factors of the throughput T of the network, which is determined by a traffic size (packet call size) $S_C$ divided by the latency, i.e., the time required for all packets to travel from a source to a destination. Specifically, the latency is a sum of the time required for the source to send all packets except the last one and the time required for the last packet to travel from the source to the destination, as given by $(m-1)S_p/R+H \cdot S_p/R$, where m is the total number of packets, $S_p$ the packet size, H, the hop count number, and R is the link speed. If the delay time D is involved for processing a packet in each node, the overall latency is equal to $(m-1)S_p/R+H \cdot S_p/R+(H-1)D$ and the throughput T is given by $T=S_C/\{(m-1)S_p/R+H \cdot S_p/R+(H-1)D\}$, indicating that throughput is variable as a function of packet size.

Assuming that the traffic size is modeled by a truncated Pareto distributed random variable producing a mean traffic size of 25 Kbytes (shape parameter $\alpha=1.1$ and scale parameter k=4.5 Kbytes, see 3rd Generation Partnership Project (3GPP), Technical Specification Group Radio Access Network, Physical Layer Aspects of UTRA High Speed Downlink Packet Access, Release 2000), and that no processing delays are involved, the throughput of the prior art multi-hop network varies as a function of packet size, as depicted in FIG. 1A. Therefore, a multi-hop network of the type where the packet size is fixed is not capable of guaranteeing maximum throughput for all hop count numbers, resulting in a "throughput gap" among routes of different hop count numbers.

If the packet size and link speed are maintained constant at 300 Octets and 100 Mbps, respectively, the throughput of the prior art network varies as a function of the processing delay as shown in FIG. 1B. Thus, the packet size that maximizes throughput varies with hop count numbers. In terms of transmission and processing delays, the prior art multi-hop wireless network also produces a "throughput gap" among routes of different hop count numbers. This problem is serious for high hop-count routes because of their large transmission and processing delays.

SUMMARY OF THE INVENTION

It is therefore an object of the present invention to provide a multi-hop network where the throughput is maximized for each route by segmenting data into packets according the hop count number of the route.

Another object of the present invention is to provide a multi-hop network where packets received for transmission over a route are placed into one of a plurality of queues that corresponds to the hop count number of the route and scheduled according to the hop count numbers of the queues.

According to a first aspect of the present invention, there is provided a network node for a multi-hop network, wherein the network node is one of a plurality of network nodes of the multi-hop network. The network node of the present invention comprises a route table for storing a plurality of routes from the network node to all destination nodes of the network and indicating respective hop count numbers of the routes, means responsive to a request for transmission of data for determining a hop count number from the route table corresponding to a route indicated in the request, means for segmenting the data into a plurality of data segments according to the determined hop count number, and means for converting the plurality of data segments to a plurality of packets.

According to a second aspect, the present invention provides a network node for a multi-hop network, wherein the network node is one of a plurality of network nodes of the multi-hop network. The network node comprises a plurality of buffers respectively corresponding to hop count numbers, means for receiving packets from the network, each packet containing a hop count number of the route of the packets whose packet size corresponds to the hop count number, and means for determining a hop count number from the received packets and storing the received packets into one of the buffers corresponding to the determined hop count number.

According to a third aspect, the present invention provides a network node for a multi-hop network, wherein the network node is one of a plurality of network nodes of the multi-hop network. The network node comprises a plurality of buffers respectively corresponding to hop count numbers, means for receiving packets from the network, wherein the size of the received packets corresponds to one of the hop count numbers, a route table for storing a plurality of routes and indicating respective hop count numbers of the routes, and means for determining a route of the received packets from the route table and a hop count number corresponding to the determined route and storing the received packets into one of the buffers corresponding to the determined hop count number.

BRIEF DESCRIPTION OF THE DRAWINGS

The present invention will be described in detail further with reference to the following drawings, in which:

FIG. 3 is an illustration of a route table of a wireless node to be used for packet transmission;

FIG. 4 is an illustration of a mapping table of the wireless node to be used in combination with the route table of FIG. 3;

FIG. 5 is an illustration of a route of the wireless node to be used for repeating packets between neighbor nodes;

FIG. 6 is a flowchart of the operation of a source node; and

FIG. 7 is a flowchart of the operation of a transit node.

DETAILED DESCRIPTION

Figure 2:
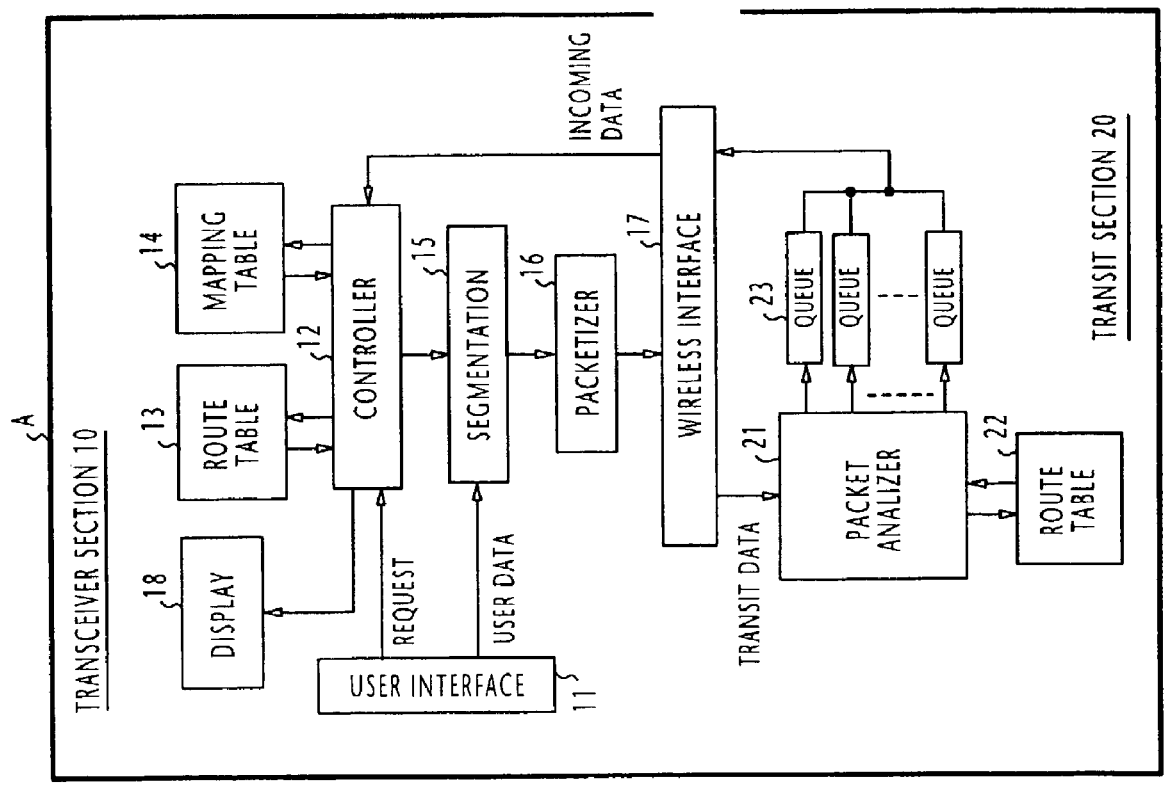
FIG. 2 is a block diagram of a multi-hop wireless network of the present invention illustrating the details of a wireless mobile node.
Figure 2:
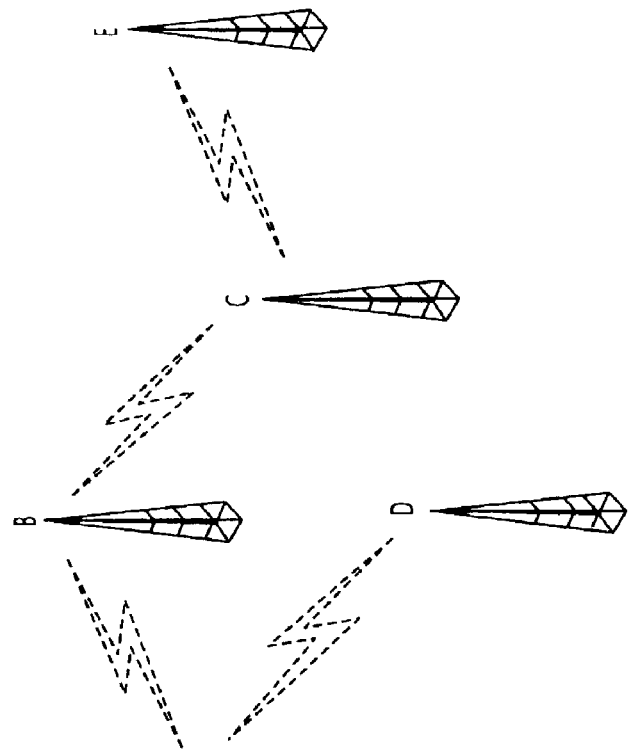

Referring to FIG. 2, there is shown a multi-hop wireless network of the present invention. The wireless network, which may be an autonomous ad hoc network or an access network, is comprised of a plurality of wireless nodes interconnected by wireless links and are respectively identified by the letters A through E. If the network is an ad hoc network, the wireless nodes are mobile nodes. If it is an access network the wireless nodes are cell-sites, or base stations, each providing a wireless connection between mobile terminals located in its own service area to a wireline core network.

It is assumed that the wireless nodes are mobile nodes to operate as a source node for transmitting packets or as a transit node for repeating packets between neighbor wireless nodes. In the example shown, the mobile node A functions as transit node when repeating packets between neighbor nodes B and D.

Each mobile node comprises a transceiver section 10 and a transit section 20. Transceiver section 10 includes a user interface 11 to which user data and a request for transmission including the destination node address are entered. The entered request is applied to a controller 12 and the user data is sent to a segmentation module 15.

Controller 12 is associated with a route table 13 and a mapping table 14. As shown in FIG. 3, the route table 13 defines a plurality of routes and corresponding hop counts. Each of the defined routes identifies a next node to a destination node. Route table 13 is created by each node exchanging control packets with neighbor nodes at periodic intervals and is updated whenever a change has taken place.

Figure 1A:
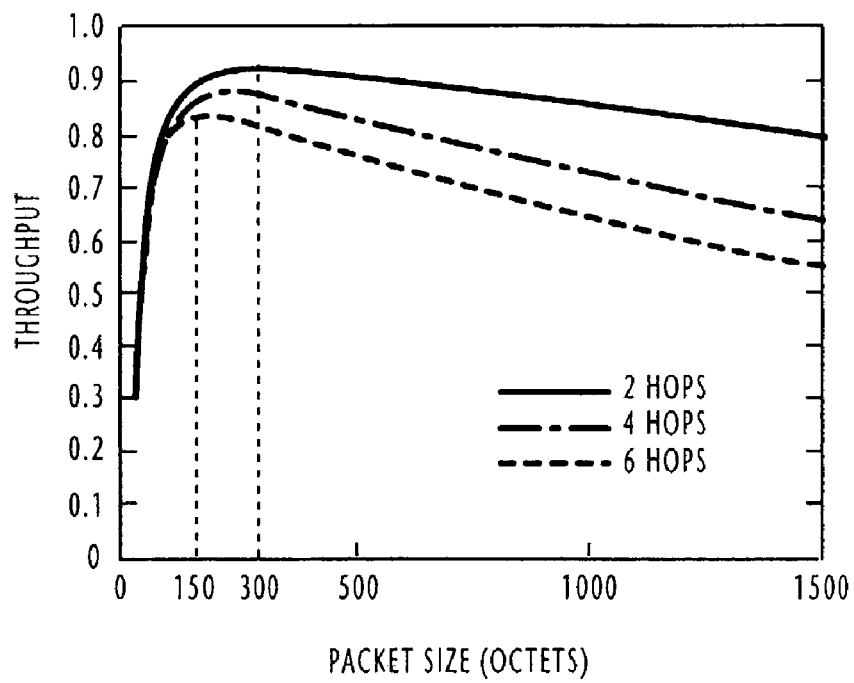
FIG. 1A is a graphic representation of the throughput of a prior art multi-hop radio access network plotted as a function of packet size for different hop counts.
Figure 1B:
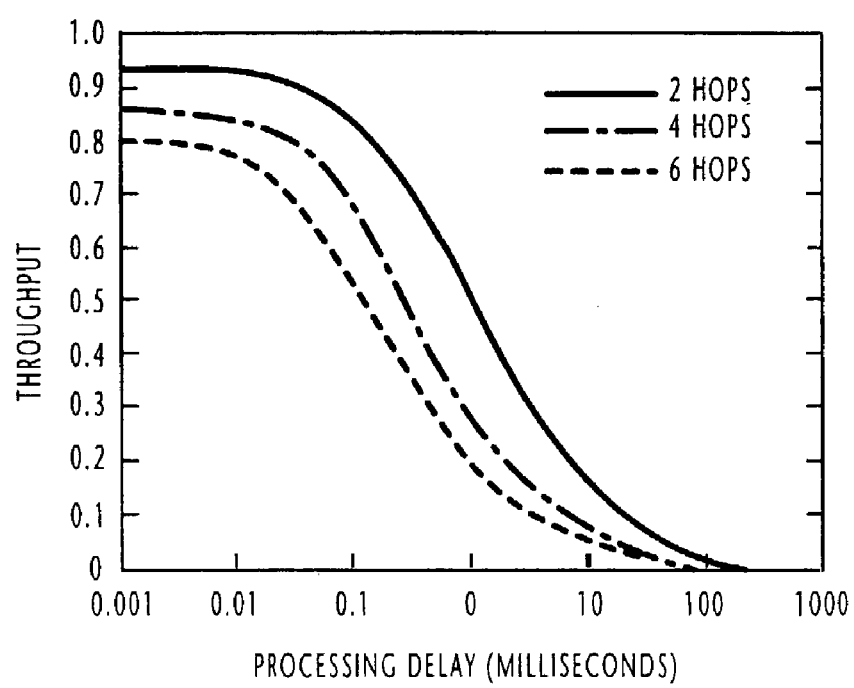
FIG. 1B is a graphic representation of the throughput of the prior art multi-hop radio access network plotted as a function of processing delay for different hop counts.

Mapping table 14, shown in FIG. 4, defines relationships between hop counts and corresponding packet sizes. In this table, the hop counts are indicated by serial numbers. Note that the mapping table 14 is prepared based on the throughput versus packet size data of FIG. 1A. If the hop count number is 2, the peak throughput is 0.9 and the packet size is 300 octets. Therefore, for a given hop count number determined by the route table 13, each packet size of the mapping table 14 represents a peak point of the throughput versus packet size curve of the given hop count number.

In response to the request for transmission from the user interface 11, the controller 12 searches the route table 13 for a route to the destination node and determines the hop count number of the route. This hop count number is then used as a key to search the mapping table 14 for a corresponding packet size.

Controller 12 supplies the determined packet size to the segmentation module 15. Segmentation module 15 divides the user data from the user, interface 11 into a plurality of data segments. In a packetizer 16, each data segment is encapsulated in a packet destined for the destination node address and transmitted from a wireless interface 17 to the network. In a modified embodiment, the packet header may include a hop count number determined by the segmentation module 15 in addition to the source and destination addresses.

Signals from the network are received by the wireless interface 17. If the received signal is an incoming packet call, it is supplied to the controller 12 and displayed on a display panel 18. If the received signal is a transit signal from a neighbor node, it is supplied to a packet analyzer 21 of the transit section 20. A route table 22 is connected to the packet analyzer 22.

As shown in FIG. 5, the route table 22 defines a plurality of source-to-destination routes and corresponding hop counts. In a manner similar to the route table 13, the route table 22 is created by each node exchanging control packets with neighbor nodes at periodic intervals and is updated whenever a change has taken place.

In response to a transit packet from a neighbor node, the packet analyzer 21 examines its header and searches the route table 22 for a hop count number corresponding to the source and destination addresses contained in the packet header. Packet analyzer 21 places the transit packet into one of a plurality of queue buffers 23 that corresponds to the hop count number detected in the route table 22 for the received packet. The packets stored in the queue buffers 23 are forwarded to the wireless interface 17 in a descending order of hop count number, i.e., in a weighted round robin fashion. Therefore, higher hop-count packets are transmitted earlier than lower hop-count packets. The prioritized packet scheduling of the weighted round robin method has the effect of advantageously reducing the delay timing differences which could otherwise arise among different routes due to different hop count numbers.

If a transit packet contains a hop count number determined by the source node, the transit node uses this hop count number for placing the packet into the queue buffers 23. In this case, the route table 22 can be dispensed with.

Since the packet size is determined based on the hop count number of a source-to-destination route so that the throughput is at a maximum, "throughput gap" among routes of different hop counts can be eliminated.

Each wireless node may be implemented with a CPU. In this case, the packet transmission (source node) and repeating (transit node) functions of the node can be achieved with flowcharts of FIGS. 6 and 7, respectively.

In FIG. 6, when a wireless node is functioning as a source node, the operation begins with decision step 31 to check to see if there is user data to transmit. If this is the case, flow proceeds to step 32 to make as search through the route table 13 for a hop count number that corresponds to the next-to-destination route of the user data. At step 33, the source node determines a packet size that corresponds to the hop count number by referencing the mapping table 14. At step 34, the user data is segmented according to the packet size. The segmented data is packetized (step 35) and transmitted (step 36).

In FIG. 7, when a wireless node is functioning as a transit node, the operation begins with decision step 11 to check to see if there is a packet received from a neighbor node. If this is the case, flow proceeds to step 42 to make as search through the route table 22 for a hop count number that corresponds to the source-to-destination route of the received packet. At step 43, the transit node places the packet into a queue buffer 23 that corresponds to the hop count number. At step 44, packets stored in the buffers 23 are scheduled for transmission according to priority levels corresponding to hop count numbers.

What is claimed is:

1. A network node for a multi-hop network, wherein the network node is one of a plurality of network nodes of the multi-hop network, comprising:

a route table for storing a plurality of routes from the network node to all destination nodes of the network and indicating respective hop count numbers of said routes;

means, responsive to a request for transmission of data, for determining a hop count number from said route table corresponding to a route indicated in said request; and means for converting said data into at least one packet whose size varies according to the determined hop count number.

2. The network node of claim 1, wherein said converting means converts said data into at least one data segment whose size varies according to said hop count number and wherein said at least one packet comprises said at least one data segment.

3. The network node of claim 1, wherein said size of said packet maximizes the throughput of said route indicated in said request.

4. The network node of claim 1, further comprising a mapping table for mapping a plurality of hop count numbers to a plurality of corresponding packet sizes, wherein each of said packet sizes maximizes the throughput of a route of a corresponding hop count number from said network node,
wherein said determining means further determines a packet size corresponding to the determined hop count number, and
wherein said converting means converts said data according to the determined packet size.

5. The network node of claim 1, wherein each route stored in the route table is obtained by said network nodes exchanging control packets with each other.

6. The network node of claim 1, wherein each route stored in the route table represents a route from a next node to a destination node.

7. The network node of claim 1, wherein,
there are plural packets and each of said packets contains said determined hop count number.

8. The network node of claim 7,
wherein there are plural packet, and
further comprising:
a plurality of buffers respectively corresponding to hop count numbers;
means for receiving the packets from the network; and
means for determining a hop count number from the received packets and storing the received packets into one of said buffers corresponding to the determined hop count number.

9. The network node of claim 1,
wherein there are plural packet, and
further comprising:
a plurality of buffers respectively corresponding to hop count numbers;
means for receiving the packets from the network;
a second route table for storing a plurality of routes from each of the network nodes to every other nodes of the network and indicating respective hop count numbers of said routes; and
means for determining a route of the received packets from the second route table and a hop count number corresponding to the determined route and storing the received packets into one of said buffers corresponding to the determined hop count number.

10. The network node of claim 9, wherein packets stored in said buffers are scheduled so that higher hop count packets are transmitted earlier from said buffers than lower hop count packets.

11. The network node of claim 9, wherein each route stored in said second route table is obtained by said network nodes exchanging control packets with each other.

12. The network node of claim 1, further comprising a wireless interface for establishing a wireless link with a neighbor network node.

13. The network node of claim 12, wherein said wireless interface further establishes a wireless link with a mobile terminal.

14. The network node of claim 1, wherein each of said network nodes is a wireless mobile node.

15. A network node for a multi-hop network, wherein the network node is one of a plurality of network nodes of the multi-hop network, comprising:
a plurality of buffers respectively corresponding to hop count numbers;
means for receiving packets from the network, each packet containing a hop count number of the route of said packets whose packet size corresponds to the hop count number; and
means for determining a hop count number from the received packets and storing the received packets into one of said buffers corresponding to the determined hop count number.

16. The network node of claim 15, wherein the size of the received packets maximizes the throughput of the route of the packets.

17. A network node for a multi-hop network, wherein the network node is one of a plurality of network nodes of the multi-hop network, comprising:
a plurality of buffers respectively corresponding to hop count numbers;
means for receiving packets from the network, wherein the size of the received packets corresponds to one of said hop count numbers;
a route table for storing a plurality of routes and indicating respective hop count numbers of said routes; and
means for determining a route of the received packets from said route table and a hop count number corresponding to the determined route and storing the received packets into one of said buffers corresponding to the determined hop count number.

18. The network node of claim 17, wherein packets stored in said buffers are scheduled so that the higher hop count packets are transmitted earlier from said buffers than lower hop count packets.

19. The network node of claim 17, wherein each route stored in said route table is obtained by said network nodes exchanging control packets with each other.

20. The network node of claim 17, wherein each route stored in said route table represents a route from each node of the network to every other node of the network.

21. A method of communication for a multi-hop network which comprises a plurality of network nodes, comprising:
a) storing, in a route table, a plurality of routes from a network node to all destination nodes of the network and indicating respective hop count numbers of said routes;
b) responsive to a request for transmission of data, determining a hop count number from said route table corresponding to a route indicated in said request; and
c) converting said data into at least one packet whose size varies according to the determined hop count number.

22. The method of claim 21, wherein the step (c) comprises converting said data to at least one data segment whose size varies according to said hop count number and wherein said at least one packet comprises said at least one data segment.

23. The method of claim 21, wherein the step (c) comprises converting said data to said at least one packet whose size maximizes the throughput of said route indicated in said request.

24. The method of claim 21, further comprising mapping a plurality of hop count numbers to a plurality of corresponding packet sizes in a mapping table, wherein each of said packet sizes maximizes the throughput of a route of a corresponding hop count number from said network node,
wherein the step (b) further determines a packet size corresponding to the determined hop count number, and
wherein the step (c) converts said data to said at least one packet according to the determined packet size.

25. The method of claim 21, further comprising exchanging control packets between said network nodes to obtain said routes of the route table.

26. The method of claim 21, wherein each route stored in the route table represents a route from a next node to a destination node.

27. The method of claim 21, wherein there are plural packets and each of said packets contains said determined hop count number.

28. The method of claim 27,
wherein there are plural packets, and
further comprising:
receiving the packets from the network; and
determining a hop count number from the received packets and storing the received packets into one of a plurality of buffers corresponding to the determined hop count number.

29. The method of claim 21,
wherein there are plural packets, and
further comprising:
storing, in a second route table, a plurality of routes from each of the network nodes to every other nodes of the network and indicating respective hop count numbers of said routes;
receiving packets from the network;
determining a route of the received packets from the second route table and a hop count number corresponding to the determined route and storing the received packets into one of a plurality of buffers corresponding to the determined hop count number.

30. The method of claim 29, wherein packets stored in said buffers are scheduled so that higher hop count packets are transmitted earlier from said buffers than lower hop count packets.

31. The method of claim 29, further comprising exchanging control packets between said network nodes to obtain said routes of said second route table.

32. A method of communication for a multi-hop network, wherein the network comprises a plurality of network nodes, comprising:
receiving packets from the network, each packet containing a hop count number of the route of said packets whose packet size corresponds to the hop count number;
determining a hop count number from the received packets; and
storing the received packets into one of a plurality of buffers corresponding to the determined hop count number.

33. The method of claim 32, wherein the size of the received packets maximizes the throughput of the route of the packets.

34. A method of communication for a multi-hop network, wherein the network comprises a plurality of network nodes, comprising:
receiving packets from the network, wherein the size of the received packets corresponds to one of said hop count numbers;
storing, in a route table, a plurality of routes and indicating respective hop count numbers of said routes; and
determining a route of the received packets from said route table and a hop count number corresponding to the determined route; and
storing the received packets into one of a plurality of buffers corresponding to the determined hop count number.

35. The method of claim 34, further comprising scheduling packets stored in said buffers so that higher hop count packets are transmitted earlier from said buffers than lower hop count packets.

36. The method of claim 34, further comprising exchanging control packets between said network nodes to obtain said routes of said route table.

37. The method of claim 34, wherein each route stored in said route table represents a route from each node of the network to every other node of the network.

* * * * *